Oct. 29, 1946.　　　R. D. DELAMERE　　　2,410,341
DISPLACEMENT APPARATUS
Filed March 2, 1942　　　4 Sheets-Sheet 1
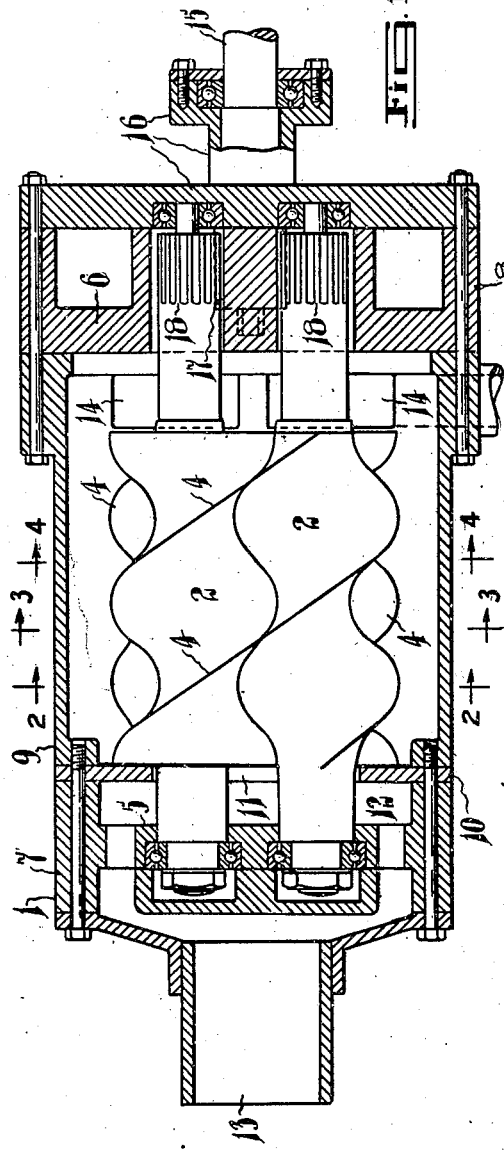
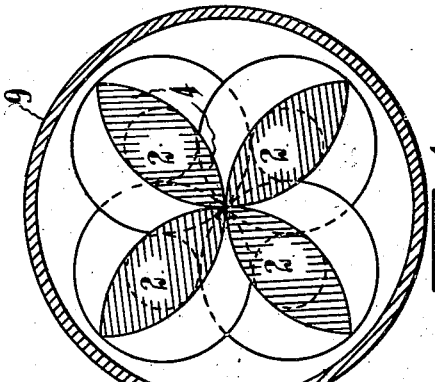
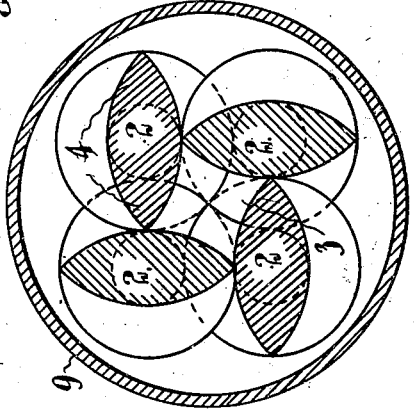
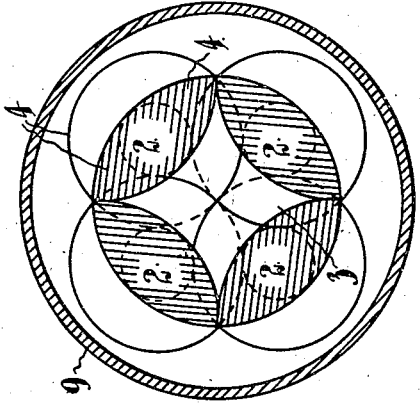
Inventor
R. D. Delamere
by Gareth E. Mayba
ATTY.

Oct. 29, 1946.                R. D. DELAMERE                2,410,341
                          DISPLACEMENT APPARATUS
                    Filed March 2, 1942          4 Sheets-Sheet 2
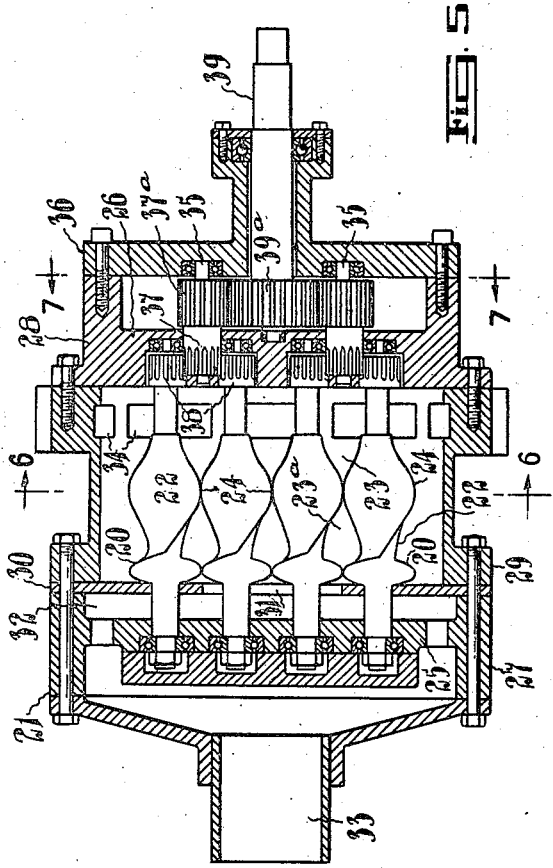
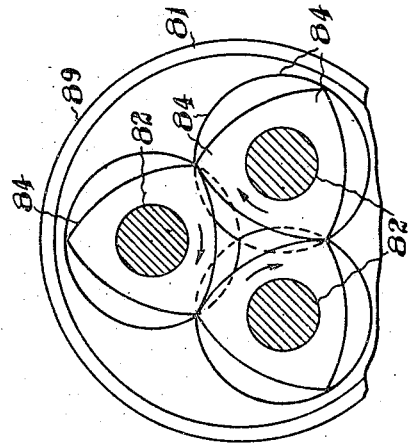
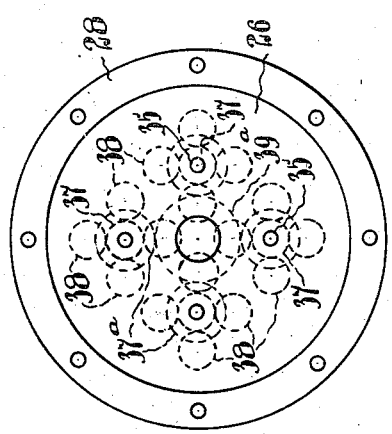
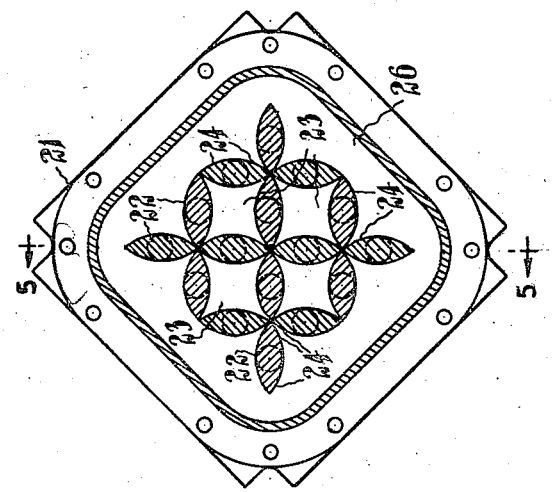
Inventor
R. D. Delamere
By Gauth C. Maybee
ATTY

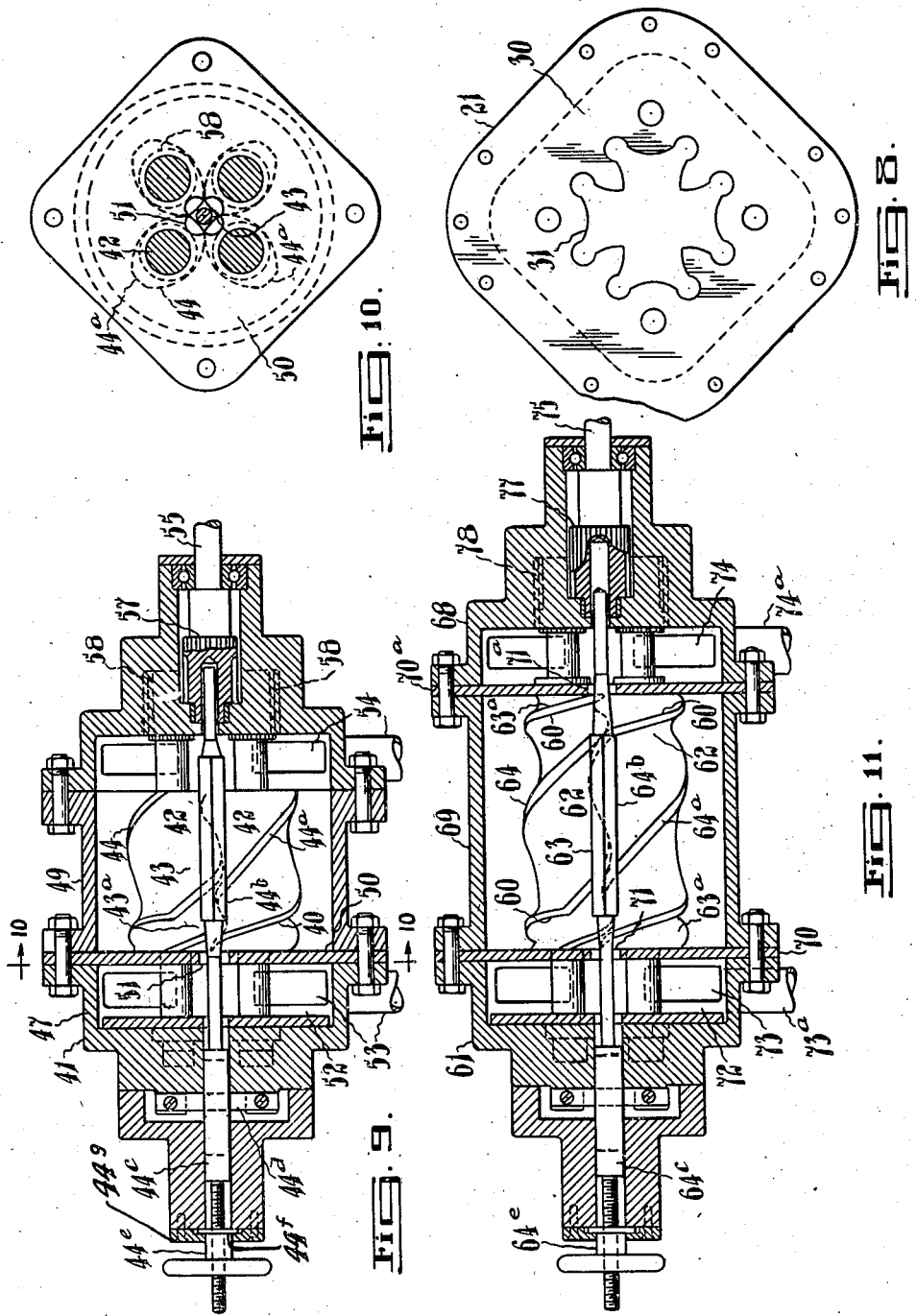

Inventor
R. D. Delamere
by Gareth E. Maybee
ATTY.

Patented Oct. 29, 1946

2,410,341

UNITED STATES PATENT OFFICE 2,410,341

DISPLACEMENT APPARATUS

Rudolf D. Delamere, Toronto, Ontario, Canada

Application March 2, 1942, Serial No. 432,972

6 Claims. (Cl. 230—143)

This invention relates to displacement apparatus and more particularly to apparatus which may be driven to serve as a pump or which may be operated to produce mechanical energy to serve as a turbine, motor and the like. The object of my invention is to devise simple and rugged apparatus of this character in which maximum displacement is obtained, in which the moving parts of the pump and turbine rotate and are geometrically perfectly sealed to provide positive action and uniform torque, in which the rotating parts produce a continuous flow and may be driven at very high speeds, and in which the compression or expansion ratio may be varied. Other objects I have in mind will hereinafter appear.

Figure 19:
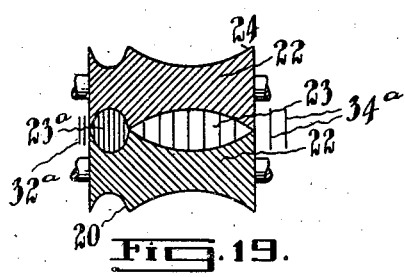
Figure 13:
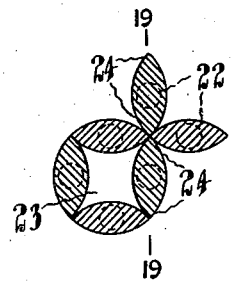

The constructions are hereafter fully described and are illustrated by way of example in the accompanying drawings, in which Figure 1 is a longitudinal section of the simplest form of the apparatus, the single group of helically ribbed elements being shown in side elevation;

Figure 2 a cross-section of the group of elements on the line 2—2 in Figure 1;

Figure 3 a cross-section on the line 3—3 in Figure 1;

Figure 4 a cross-section on the line 4—4 in Figure 1;

Figure 5 a longitudinal section on the line 5—5 in Figure 6, of a modified form of the apparatus;

Figure 6 a cross-section on the line 6—6 in Figure 5;

Figure 7 a cross-section on the line 7—7 in Figure 5;

Figure 8 an end view of the plate between the chamber and the pockets in Figure 5;

Figure 9 a longitudinal section of another modified form of the apparatus;

Figure 10 a cross-section on the line 10—10 in Figure 9;

Figure 11 a longitudinal section of a further modification;

Figure 12 a cross-section of a different shaped group of elements;

Figures 13 to 18, diagrammatic views in end elevation of two groups of ribbed elements illustrating a complete cycle of the movements thereof;

Figure 19 a diagrammatical cross-section on the line 19—19 in Figure 13; and

Figures 20 to 24 cross-sectional diagrammatic views, corresponding to Figure 19, of Figures 14 to 18.

In the drawings like numerals of reference indicate corresponding parts in the different figures.

Referring particularly to Figures 1 to 4, 1 is a casing which may consist of a central and two end sections. In the casing are journalled a group of four helically ribbed elements 2 which are rotatable in the same direction and are meshed with one another so that adjacent portions of the meshed ribs constitute the walls of a succession of pockets 3 which travel from one end of the ribs to the other during the rotation of the elements. Each of the elements 2 has two ribs 4 arranged like a double thread on a screw so that the convolutions of the ribs are 180° apart. The ribs on the elements are substantially the same diameter and pitch and are so shaped that they will intermesh with the ribs 4 on two adjacent elements. Thus the ribs on the group of elements co-operate to form the successive pockets 3 on the center line around which the elements are arranged. The number of pockets produced on the center line depends on the number of turns or leads of the ribs.

The opposite ends of the elements are provided with spindles which are journalled in suitably carried ball-bearings. The casing 1 comprises a central section 9 and end sections 7, 8 having transverse walls 5, 6. Between the end section 7 and the central section 9 is interposed a plate 10 for preventing fluid under pressure from passing back to the low pressure central section 9. Openings are formed in the plate for the passage of one spindle of each element. The plate is also provided with a central opening 11 for establishing communication between the outer end of a pocket 3 and a chamber 12. The latter is formed in the end section 7 beyond the plate 10. The wall 5 of the end section 7 is apertured or formed as a spider to form a communication between the chamber 12 and an outlet 13. The wall 6 of the end section 8 is solid, and the peripheral wall of the central section 9 is provided with one or more inlet openings 14. A shaft 15, journalled in a cover 16 for the end section 8 and in the wall 6, carries a gear 17 which is meshed with pinions 18 on the spindles of the elements 2. By driving the shaft 15, the gear 17 will rotate the pinions 18, and thus the elements 2 will be driven in the same direction of rotation. Since the helical ribs 4 are rotated in unison the ends of the ribs are moved from the position shown in Figure 3 to that shown in Figure 4 whereby the pocket is successively opened and closed. Thus fluid drawn into the inlet end of the pocket is subsequently trapped therein and thereafter is caused to travel longitudinally in the pocket until it is discharged into the chamber 12.

In Figures 5 to 8 is shown an advanced form of my invention for displacing gases. In the casing 21 are journalled a plurality of groups of helically ribbed elements 22 which are rotatable in the same direction. Each of the elements 22 has two ribs 24 and each rib has a long pitch, similar to that of the rib 4, and a comparatively short pitch 20. Each group of four elements thus forms a succession of pockets 23 which vary in size in accordance to the variation in the pitch of the ribs 24. The small sized pocket 23ª, which is formed by the short pitched portions 20, communicates through the opening 31 in the plate 30 with the chamber 32. As the gas trapped in the large pocket 23 is moved longitudinally, by the long pitched portions of the ribs 24, it is brought into contact with the short pitched portions 20 of the ribs whereby the pocket is reduced to the small pocket 23ª and the gas is compressed therein. The compression ratio of the gas entering and leaving the pockets may be such that the pressure of the gas in the small pocket equals the pressure of the gas in the chamber 32. Thus there will be no flow of gas from the chamber into the small pocket as it is opened whereby only the supply of gas in the small pocket is ejected by the short pitched portions 20 when said pocket is opened.

The casing 21 has end sections 27, 28 corresponding to the parts 7, 8. The outlet 33 corresponds to the outlet 13 and the inlet openings 34 correspond to those designated 14. There are four shafts 35 corresponding to the shaft 15 and similarly journalled in the cover 36 and wall 26. Each shaft 35 carries a gear 37 meshed with the pinions 38 on the spindles of the four elements 22 arranged about the shaft. Each shaft 35 also carries a pinion 37ª which is meshed with a gear 39ª secured to a shaft 39 journalled in the cover. The sixteen elements 22 are so arranged around the shaft 39 that they will intermesh and co-operate with two or more adjacent elements to produce nine sets of pockets 23, 23ª. Thus by increasing the number of elements from four in Figures 1 to 4 to sixteen in Figures 5 to 8 the number of sets of pockets 3 or 23 and 23ª is increased from one to nine whereby nine times the volume of gas is displaced by employing four times the number of elements. If nine elements are employed, four sets of pockets will be produced. The number of sets of pockets formed by any number of intermeshing elements arranged in a rectangle may be determined by multiplying the number of elements less one along one side of the rectangle by the number of elements less one along an adjacent side of the rectangle. For example, if 20 elements be arranged with 5 along one side and 4 along the adjacent side, the number of sets of pockets will be $(5-1) \times (4-1) = 12$ sets of pockets.

Figure 20:
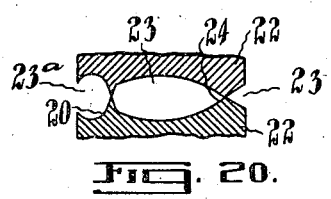
Figure 14:
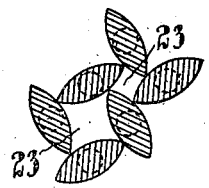
Figure 21:
Figure 15:
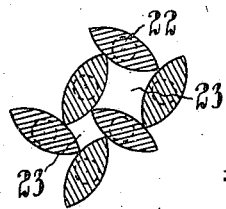
Figure 22:
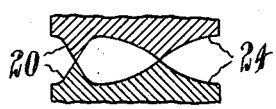
Figure 16:
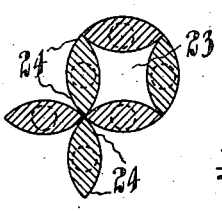
Figure 23:
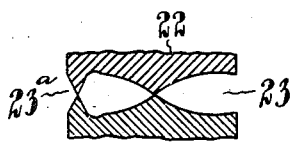
Figure 17:
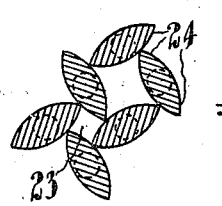
Figure 24:
Figure 18:
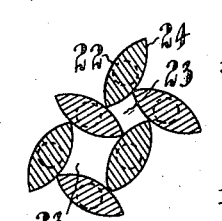

Referring to Figures 13 to 24, the cycle of movements of the ribbed elements 22 is diagrammatically illustrated to show the displacement of gas through the sets of pockets 23, 23ª. In Figures 13 and 19 the pockets, formed on the line 19—19 in Figure 13, are shown with their ends closed; the gas in the large pocket 23 is substantially at atmospheric pressure, and the gas in the small pocket 23ª is compressed as indicated by the vertical lines in both pockets to the desired pressure. The spacing of the vertical lines 34ª outside the large pocket indicates the atmospheric pressure from the openings 34 and it will be noted this spacing is the same as that in the large pocket. The spacing of the vertical lines 32ª outside the small pocket indicates the pressure therein is equal to that in the chamber 32. In Figures 14 and 20, the small pocket 23ª is communicating with the chamber 32, the outer end of the initial large pocket 23 is moved toward the small pocket thus slightly compressing the gas in said large pocket, and a succeeding large pocket communicating with the openings 34 is beginning to be formed. In Figures 15 and 21, 16 and 22, and 17 and 23 the small pocket 23ª is gradually further opened to the chamber 32, the second large pocket is also gradually further opened to the openings 34, and the outer end of the initial large pocket is gradually moved toward the small pocket to gradually compress the gas. In Figures 18 and 24, the second large pocket is nearly closed to trap a fresh supply of gas (as shown in Figures 13 and 19), and the initial large pocket is nearing its final position in which it eventually becomes the small pocket as shown in Figures 13 and 19. Thus the cycle is completed whereby the apparatus may be used as a pump as just described, or as a motor, engine, or turbine by directing gas under pressure through the openings 33 into the small pocket 23ª and permitting the gas to expand into the large pocket 23 to drive the ribbed elements 22.

Again referring to Figures 13 to 18 and to Figure 6, it will be observed that the pockets 23 of adjacent sets are opened alternately and the pockets 23ª of adjacent sets are also opened alternately so that a substantially constant flow of gas to the chamber 32 is maintained when the apparatus is being used as a pump. In Figure 13, the pockets adjacent the closed pockets on the line 19—19 are fully opened and, as the closed pockets are gradually opened in Figures 14 to 16, the initially fully opened pockets are gradually closed. Of the two sets of pockets illustrated, the sum of the opened areas is substantially the same throughout the cycle. When the apparatus is being used as a turbine etc., the flow of gas or steam is also substantially constant so that the drive shaft 35 will have a substantially constant torque.

Figures 9 and 10 show means for varying the compression or expansion ratio between the large and small pockets. In the casing 41 is journalled a group of four helically ribbed elements 42, each element having two ribs 44 and each rib having a long pitch and a comparatively short pitch 40. Thus the elements 42 are similar to the elements 22, and form pockets 43, 43ª similar to the pockets 23, 23ª whereby the gas trapped in the initially large pocket 43 is moved longitudinally of the elements until said pocket is reduced in size to compress the gas before it passes into the chamber 52.

The opposite sides or roots of the ribs 4 and 24 of Figures 1 to 8 and 13 to 24 are curved and terminate in points forming a sharp edge at the periphery of each rib. Thus not only do the sides of the ribs on one element co-operate with the sides of the ribs on adjacent elements but the peripheries of the ribs on one element co-operate with the adjacent elements to form the substantially sealed pocket 3 or pockets 23, 23ª.

In Figures 9 and 10, the curved opposite sides or roots of the ribs 44 terminate in arcs 44ª at their peripheries whereby a small passageway is established through the centers of the pockets 43, 43ª. Of course this necessitates the curved opposite sides or roots of the ribs being shaped and proportioned slightly differently to the shape and proportions of the curved opposite sides of the ribs in Figures 1 to 8 and 13 to 24 so that the pockets 43 and 43ᵃ will be sealed except for the said passageway. This passageway, which has four arc-shaped sides formed by the arcs 44ᵃ on the peripheries of the ribs 44 on the four elements of the group, would unless closed form a communication between the successive pockets 43, 43ᵃ. The said passageway extends through the center of each group of elements, and a rod 44ᵇ is slidably fitted in said passageway to serve as a cut-off whereby the compression or expansion ratio between the successive pockets 43, 43ᵃ may be varied. The cross-sectional area of the rod is substantially that of the passageway so that the pockets 43 and 43ᵃ may be closed and thus the maximum ratio of compression or expansion be obtained which in the drawings is 4 to 1, i. e. 25% cut-off since the lead of the long pitch 44 is four times the lead of the short pitch 40. In Figure 9, the length of the rod must be the length of the short pitched portion of the element plus, at least, one pitch of the long pitched portion of the element.

Another way of considering this cut-off is that the short pitched portion in conjunction with the rod may be considered as a rotary valve in a steam engine in which the axial movement of the rod changes the timing of admission of steam to the cylinder. When the rod is moved to the left in Fig. 9, the 25% cut-off occurs when the volume in the cylinder is one-quarter (or the volume of the small pocket) of its piston displacement which displacement is the equivalent of the volume of my large pocket. The steam now expands to the volume of the large pocket and is then exhausted.

When the rod is moved half-way between its extreme right and left hand positions, the cut-off occurs later in the cycle at which point the steam entrapped is one-half the volume of the small pocket and one-half the volume of the large pocket which is the equivalent of five-eighths of the volume of the large pocket, providing the short pitched portion of the element is uniform. The steam now expands to the volume of the large pocket and is then exhausted. This is equivalent to 62½% cut-off.

When the rod is moved to the extreme right hand position as shown in Fig. 9, the cut-off occurs later at which point the steam entrapped is the volume of the large pocket. No expansion occurs and the cut-off is therefore 100%.

It is obvious that torque is applied to the elements during admission of the gas and also during expansion thereof, if any expansion occurs.

Any suitable means may be provided to shift the rod 44ᵇ. The opposite ends of the rod are reduced in diameter to clear the said arc-shaped sides of the passageway and one end of the rod is slidable in a hole bored in the gear 57 on the shaft 55. The gear 57 meshes with the pinions 58 on the spindles of the elements 42. The other reduced end of the rod freely passes through the opening 51 in the plate 50 whereby gases will flow from the point of uncovering of the small pocket 43ᵃ through the passageway and said opening into the end section 47 which has radially directed outlets 53. The last-mentioned reduced end is provided with a plunger 44ᶜ which is slidable in the end section 47.

The plunger 44ᶜ and thus the rod 44ᵇ are held from turning by means of a key or strip of metal 44ᵈ which extends transversely through a slit in the plunger. A nut 44ᵉ threaded on the reduced outer end of the plunger is provided with a flange 44ᶠ which is received in a recess formed in a cap 44ᵍ which is secured to the end of the outer section 47 and is bored for the passage of the nut therethrough. The outer end of the nut may be provided with a hand-wheel. The nut is thus held from axial movement relative to the outer section 47 although the nut is free to be turned to move the rod 44ᵇ axially to vary the compression or expansion ratio.

In Figure 11 the apparatus is shown for use as a reversible engine or turbine. The casing 61 carries a group of helically ribbed elements 62, each element having two ribs 64 and each rib having a long pitch and a comparatively short pitch 60 at each end of the long pitch. The peripheries of the ribs 64 are shaped like the ribs 44 to produce a passageway through the center of each group of elements. A rod 64ᵇ similar to the rod 44ᵇ is slidably fitted in said passageway so that it may be moved to close simultaneously a large pocket 63 and the small pocket 63ᵃ at one end or the other of the elements 62. The long pitched portions of the elements 62 are of greater length than the corresponding portions of the elements 42 to form two large pockets 63 whereby the rod 64ᵇ will close one of said pockets when it is shifted to close or partially close the small pocket 63ᵃ at one end of the element. When the rod is shifted to close or partially close the small pocket at the opposite end of the element, the other large pocket will be closed. Thus the length of the long pitched portion of the element must be, at least, equal to the length of a short pitched portion plus one pitch of the long pitched portion. The length of the rod must not be less than the length of a short pitched portion plus one pitch of the long pitched portion and it must not be longer than the length of the long pitched portion.

If steam or other gas under pressure be directed through a valve controlled pipe 74ᵃ into the inlet openings 74 in the end section 68 and the rod 64ᵇ be shifted to the right in Figure 11 to close or partially close the small pocket 63ᵃ adjacent the end section 68, the gas will flow through the opening 71ᵃ in the additional plate 70ᵃ into the small pocket to drive the elements in one direction of rotation. The steam or other compressed gas trapped in the small pocket will travel longitudinally as the short pitched portions of the ribs 64 are rotated until it is brought into contact with the long pitched portions of the ribs when it will expand into the succeeding large pocket 63. The expanded gas will escape into the passageway when it reaches the left hand end of the rod 64ᵇ, then flow through the opening 71 in the plate 70 into the chamber 72 and then through the outlet 73 into a valve controlled pipe 73ᵃ. To reverse the direction of rotation of the elements 62, the rod 64ᵇ is shifted to the left to close or partially close the small pocket adjacent the plate 70, the pipe 74ᵃ is opened to the atmosphere and the pipe 73ᵃ is connected with the source of steam or compressed gas whereby the flow of gas is reversed. The greater the small pocket is closed by the rod the greater the expansion ratio between the small and large pockets. The means for operating the rod 64ᵇ may be the same as those for operating the rod 44ᵇ.

It will be understood that the apparatus shown in Figures 5 to 8, and in Figures 9 and 10 may be converted into a turbine or engine by merely directing compressed gas through the chamber 32 or 52 and permitting it to escape through the openings 34 or 54. That is to say, by using the last mentioned openings for exhaust purposes and the exhaust openings 33 or 53 as inlets, the elements 22, 42 will be driven to drive the shaft 35, 55. It is also obvious that the ribs 24, 44 and 64 may be gradually changed in pitch to form the large and small pockets.

In Figure 12 is shown a group of three intermeshing elements 82, each having three ribs 84 arranged like a triple thread on a screw in which the convolutions of the ribs or threads are 120° apart. The ribs on this modified group of elements could be made with a constant pitch as shown in Figure 1 or a variable pitch as shown in Figures 5, 9 and 11. However, I prefer to employ a group or a plurality of groups, each comprising four elements whereby pockets of larger cross-sectional area are obtained.

What I claim as my invention is:

1. Apparatus of the class described comprising at least three rotatable elements, each element being provided with a plurality of helical ribs, each rib having a short pitch at each end and a comparatively long pitch intermediate the short pitched portions; the elements being meshed with one another and rotatable in the same direction to form a succession of pockets which change in size as they travel from one end of the ribs to the other during the rotation of the elements; means for admitting or exhausting gas into or from the pocket at one end of the elements; means for exhausting or admitting gas from or into the pocket at the other end of the elements; means to rotate or be rotated by the rotatable elements; and means for controlling the operation of a large pocket and either one of the small pockets or a portion thereof to permit the elements to be driven in either direction of rotation by the gas or to permit the elements to drive the gas in either direction through the pockets and to vary the compression and expansion ratio of the gas entering and leaving the pockets.

2. Apparatus of the class described comprising at least three elements, each element being provided with a plurality of ribs, each rib having a long pitch and a comparatively short pitch at each end of the long pitch, the elements being meshed with one another and rotatable in the same direction so that the ribs form a succession of pockets which change in size from small to large and then to small as they travel from one end of the ribs to the other during the rotation of the elements, the ribs being shaped to form a passageway through the pockets; means for admitting or exhausting gas into or from one end of the passageway; means for exhausting or admitting gas from or into the other end of the passageway; means to rotate or be rotated by the rotatable elements; an axially movable rod in said passageway for closing and opening the pockets, the length of the rod and of the long pitched portions of the elements being such that the rod will extend simultaneously through sufficient of the long pitched portions to form a pocket and through one or the other of the short pitched portions to regulate the volume of the pocket formed thereby; and means for moving the rod to vary the volume of the last mentioned pocket relative to that of the first mentioned pocket so that the compression or expansion ratio of the gas entering and leaving the pockets may be varied.

3. Apparatus of the class described comprising a casing having a chamber at each end thereof; at least three helically ribbed elements journalled in said casing intermediate the chambers and rotatable in the same direction, each element being meshed with two adjacent elements, each rib having a long pitch and a comparatively short pitch at each end of the long pitch to form a succession of pockets which change in size from small to large and then to small as they travel from one end of the ribs to the other during the rotation of the elements, each small pocket being adapted to communicate with the adjacent chamber, the ribs being shaped to establish a passageway through the different sized pockets; means for admitting or exhausting gas into or from one of the chambers; means for exhausting or admitting gas from or into the other chamber; means to rotate or be rotated by the rotatable member; and a rod axially movable in said passageway for closing and opening the pockets, the length of the rod and of the long pitched portions being such that the rod can simultaneously close a large pocket and a small pocket at either end of the elements and means for shifting the rod to change the point of exit of gas from or its intake into the pockets so that the compression or expansion ratio of the gas entering and leaving said large and small pockets may be varied.

4. Apparatus of the class described comprising at least three elements, each element being provided with a plurality of ribs, each rib having a long pitch and a comparatively short pitch at each end of the long pitch, the elements being meshed with one another and rotatable in the same direction so that the ribs form a succession of pockets which change in size from small to large and then to small as they travel from one end of the ribs to the other during the rotation of the elements, the ribs being shaped to form a passageway through the pockets; means for admitting or exhausting gas into or from one end of the passageway; means for exhausting or admitting gas from or into the other end of the passageway; means to rotate or be rotated by the rotatable elements; a rod having a cross sectional area corresponding to that of the passageway for closing it, the length of the rod and of the long pitched portions of the elements being such that the rod will extend simultaneously through sufficient of the long pitched portions to form a pocket and through one or the other of the short pitched portions, the rod being reduced in cross-section at opposite ends to clear the arc shaped sides of the passageway; and means connected with one of the reduced ends of the rod to move it axially to vary the compression or expansion ratio of the gas entering and leaving the pockets.

5. Apparatus of the class described comprising at least three elements, each element being provided with a plurality of helical ribs, each rib having a short pitched portion at one end and a long pitched portion, the elements being meshed with one another and rotatable in the same direction so that the ribs form a succession of pockets which change in volume as they travel from one end of the ribs to the other during the rotation of the elements, said pockets being smaller at the short pitched end and the ribs being so shaped that they form a passageway through the intermeshed portions and between the pockets; means for admitting or exhausting gas into or from the pockets at the short pitched end of the elements; means for exhausting or admitting gas from or into the pockets at the other end of the elements; means to rotate or be rotated by the rotatable elements; a rod in said passageway for controlling the point of admittance of gas into or the escape of gas from the pocket formed by the short pitched portions of the elements to regulate the volume of the last mentioned pocket; and means for moving the rod and elements axially relative to one another to vary the said volume relative to that of a pocket formed by the long pitched portions of the elements so that the compression or expansion ratio of the gas entering and leaving the pockets may be varied.

6. Apparatus of the class described comprising at least three elements, each element being provided with a plurality of helical ribs, each rib having a short pitched portion at one end and a long pitched portion, the elements being meshed with one another and rotatable in the same direction so that the ribs form a succession of pockets which change in volume as they travel from one end of the ribs to the other during the rotation of the elements, said pockets being smaller at the short pitched end, and the ribs having curved sides terminating in arcs forming a passageway through the pockets; means for admitting or exhausting gas into or from the pockets at the short pitched end of the elements; means for exhausting or admitting gas from or into the pockets at the other end of the elements; means to rotate or be rotated by the rotatable elements; a rod in said passageway having a cross sectional area corresponding to that of the passageway for closing it, the rod being reduced in cross section at the short pitched end of the elements to clear the arc shaped sides of the passageway; and means connected with said reduced end of the rod to move it axially to vary the compression or expansion ratio of the gas entering and leaving the pockets.

RUDOLF D. DELAMERE.